(12) United States Patent
Kobayashi

(10) Patent No.: US 11,249,698 B2
(45) Date of Patent: Feb. 15, 2022

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Hiroaki Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/029,131

(22) Filed: Sep. 23, 2020

(65) Prior Publication Data
US 2021/0089249 A1    Mar. 25, 2021

(30) Foreign Application Priority Data

Sep. 24, 2019 (JP) .............................. JP2019-173144

(51) Int. Cl.
*G06F 3/12* (2006.01)

(52) U.S. Cl.
CPC .......... *G06F 3/1207* (2013.01); *G06F 3/1204* (2013.01); *G06F 3/1222* (2013.01); *G06F 3/1238* (2013.01); *G06F 3/1239* (2013.01); *G06F 3/1259* (2013.01); *G06F 3/1267* (2013.01); *G06F 3/12* (2013.01)

(58) Field of Classification Search
CPC .... G06F 3/1207; G06F 3/1222; G06F 3/1267; G06F 3/1239; G06F 3/1204; G06F 3/1259; G06F 3/1238; G06F 3/1285; G06F 3/12; G06F 3/1201

USPC ........................................................ 358/1.14
See application file for complete search history.

(56) References Cited

U.S. PATENT DOCUMENTS

| 2011/0304872 A1 | 12/2011 | Odagiri | |
| 2013/0242335 A1* | 9/2013 | Naitoh | G06F 3/1288 358/1.14 |
| 2014/0337970 A1* | 11/2014 | Yamada | G06F 21/31 726/19 |
| 2020/0387333 A1 | 12/2020 | Nakajima | |
| 2021/0089247 A1 | 3/2021 | Nakajima | |

FOREIGN PATENT DOCUMENTS

JP    2016117158 A    6/2016

OTHER PUBLICATIONS

Office Action issued in U.S. Appl. No. 17/029,122 dated Apr. 19, 2021.
Office Action issued in U.S. Appl. No. 17/029,122 dated May 6, 2021.

* cited by examiner

*Primary Examiner* — Miya J Williams
*Assistant Examiner* — Darryl V Dottin
(74) *Attorney, Agent, or Firm* — Rossi, Kimms & McDowell LLP

(57) ABSTRACT

In a case where a print job that is not performed according to designation of an object is included in print jobs stored in association with identification information of an authenticated user, an image processing apparatus gives notification that the print job that is not performed according to the designation of the object is included, to the authenticated user.

7 Claims, 13 Drawing Sheets

IMAGE PROCESSING APPARATUS, CONTROL METHOD FOR IMAGE PROCESSING APPARATUS, AND STORAGE MEDIUM

BACKGROUND OF THE INVENTION

Field of the Invention

The present disclosure relates to an image processing apparatus, a control method for the image processing apparatus, and a storage medium used for performing the control method.

Description of the Related Art

In recent years, for the purpose of improvement of security, there is an image processing apparatus (or image forming apparatus) that once stores a print job input from a printer driver in a hard disk of the apparatus, and prints the stored print job after user authentication from an operation device of the apparatus.

Besides, there is an image processing apparatus that can perform a specific function of the apparatus, such as printing, facsimile transmission or the like of a stored print job by using a shortcut function. Here, the shortcut function is a function that previously defines the processing content required to perform the specific function, and then performs the specific function quickly by using the defined processing content.

Besides, in an image processing apparatus that has many applications, there is a technique of displaying buttons for performing the functions of the applications that a user may want to use, respectively at positions that are easy for the user to use.

Japanese Patent Application Laid-Open No. 2016-117158 discloses a technique of, on an application selection screen displayed on an operation device of an image forming apparatus, changing display order of applications. For example, in a case where print jobs input from an information processing terminal have been accumulated, although default activation order of the application of "printer" is "2", display order on the application selection screen is changed to "1". Thus, since an icon of the application desired by a user is displayed on the higher level on the application selection screen, the user can quickly reach the desired icon.

As just described, it is possible by using the shortcut function to immediately perform printing of print data stored in the image processing apparatus. However, there is a case where although the user instructs to immediately perform the printing of the print data stored in the image processing apparatus by the shortcut function, a part of the print data stored in the image processing apparatus is not printed.

For example, in a case where there is a setting to limit the number of jobs capable of being printed at one time for preventing the image processing apparatus from being occupied, or in a case where there is a setting by an administrator to prohibit a one-sided printing function for reducing costs, not all of the print data stored in the image processing apparatus is printed.

At this time, there is a problem that the user cannot recognize that the print data for which printing will not be performed exists, before instructing immediate performance of printing.

SUMMARY OF THE INVENTION

The present disclosure is characterized by an image processing apparatus having an operation device, comprising one or more memories, and one or more processors that execute a set of instructions to: receive a print job from an information processing apparatus; store the received print job in a storage device in association with identification information of a user; authenticate a user; and without the user selecting at least one print job among the print jobs stored in association with the identification information of the authenticated user, perform the at least one print job according to designation of an object for performing the at least one print job, wherein the one or more processors further execute the set of instructions to, in a case where a print job that is not performed according to the designation of the object is included in the print jobs stored in association with the identification information of the authenticated user, give notification that the print job that is not performed according to the designation of the object is included, to the authenticated user.

Further features of the present disclosure will become apparent from the following description of exemplary embodiments with reference to the attached drawings.

DESCRIPTION OF THE EMBODIMENTS

Hereinafter, embodiments for carrying out the present disclosure will be described with reference to the attached drawings. Incidentally, the following embodiments do not limit the disclosure according to claims, and all combinations of the features described in the embodiments are not necessarily essential to the solution means of the disclosure.

First Embodiment

<Image Processing Apparatus>

Figure 1:
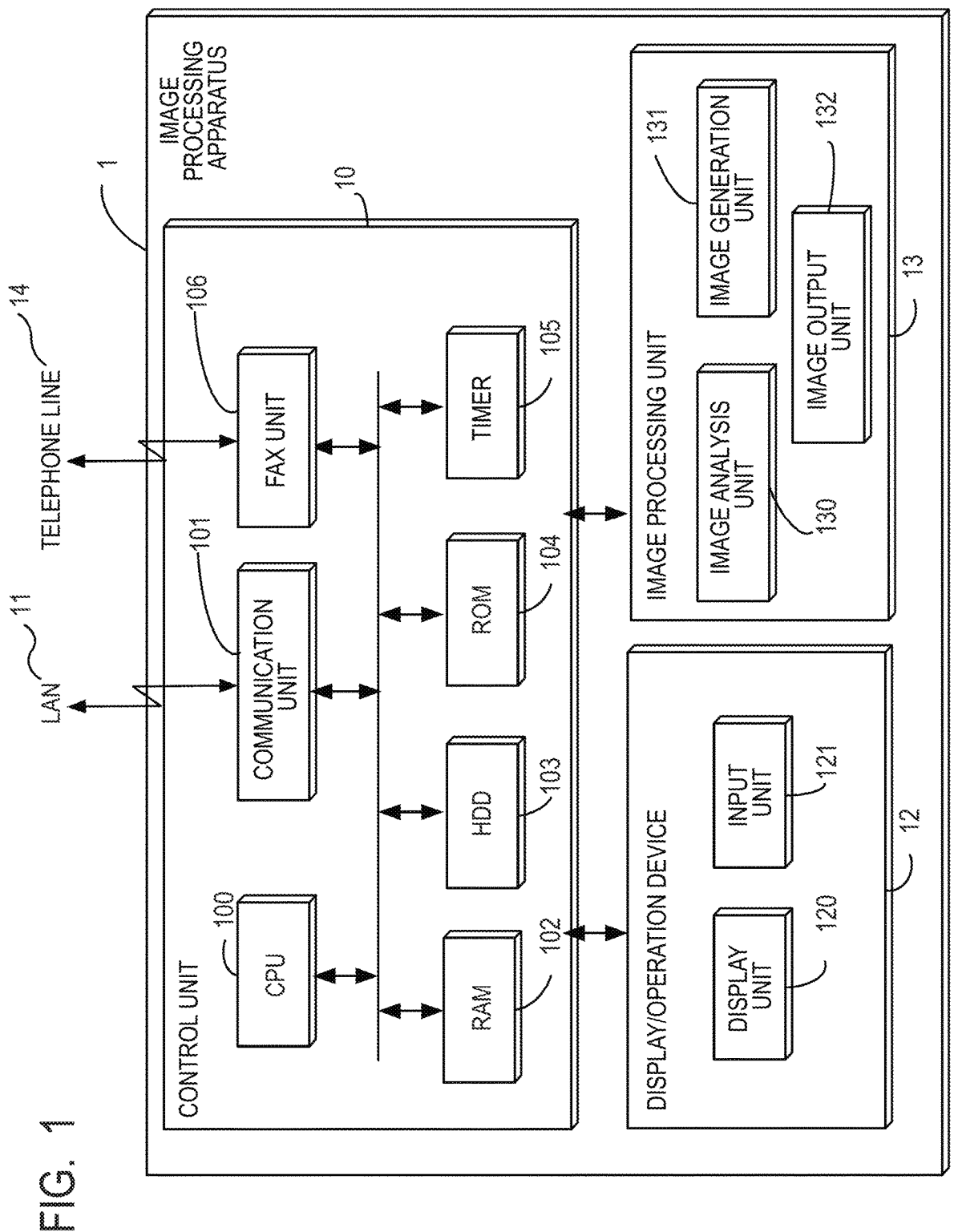
FIG. 1 is a hardware constitution diagram of an image processing apparatus according to an embodiment.

FIG. 1 is a block diagram for describing a hardware constitution of an image processing apparatus 1 according to one embodiment of the present disclosure.

A control unit 10 controls operations of each unit of the image processing apparatus 1. The control unit 10 includes a CPU (central processing unit) 100, a communication unit 101, a RAM (random access memory) 102, an HDD (hard disk drive) 103, a ROM (read only memory) 104, a timer 105, and a fax unit 106.

The CPU 100 controls the entire control unit 10. The communication unit 101 transmits and receives data via a LAN (local area network) 11. The LAN 11 is a network for exchanging data with an information processing apparatus, and the image processing apparatus 1 is connected to the Internet via the LAN 11.

The RAM 102 provides a system work memory for the CPU 100 to operate. The HDD 103 is a hard disk drive, and may be, for example, another storage device such as a magnetic disk, an optical medium, a flash memory or the like, or a combination of these devices. The HDD 103 can store document data, setting data and the like. Besides, the HDD 103 does not have to exist in the image processing apparatus 1. For example, an external server, an external personal computer or the like may be used as a storage device via the communication unit 101.

The ROM 104 is a boot ROM that stores a system boot program. The CPU 100 loads a program installed in the HDD 103 into the RAM 102 by using the boot ROM of the ROM 104, and performs various controls based on the program.

The timer 105 times according to an instruction from the CPU 100, and notifies the CPU 100 by an interrupt or the like when the instructed time has elapsed. The fax unit 106 transmits and receives fax data via a telephone line 14.

A display/operation device 12 is controlled by the control unit 10, and includes a display unit 120 and an input unit 121. The display unit 120 is a display for displaying information of the image processing apparatus to a user. The input unit 121 receives an input from a user via an interface such as a touch panel, a mouse, a camera, voice input, a keyboard or the like.

An image processing unit 13 is controlled by the control unit 10, and includes an image analysis unit 130, an image generation unit 131 and an image output unit 132.

The image analysis unit 130 analyzes a structure of an original document image, and extracts necessary information from a result of the analysis.

The image generation unit 131 reads (for example, scans) an original document, digitizes the image of the original document, generates image data, and stores the generated image data in the HDD 103. Also, the image generation unit 131 can generate original document image data in another format by using the information analyzed by the image analysis unit 130.

The image output unit 132 outputs image data of an original document stored in the HDD 103 or the like. An example of such an output method includes printing the image data on paper, transmitting the image data to an information processing device, a server, a facsimile machine or the like network-connected via the communication unit 101, or storing the image data in a storage medium connected to the image processing apparatus 1.

Figure 2:
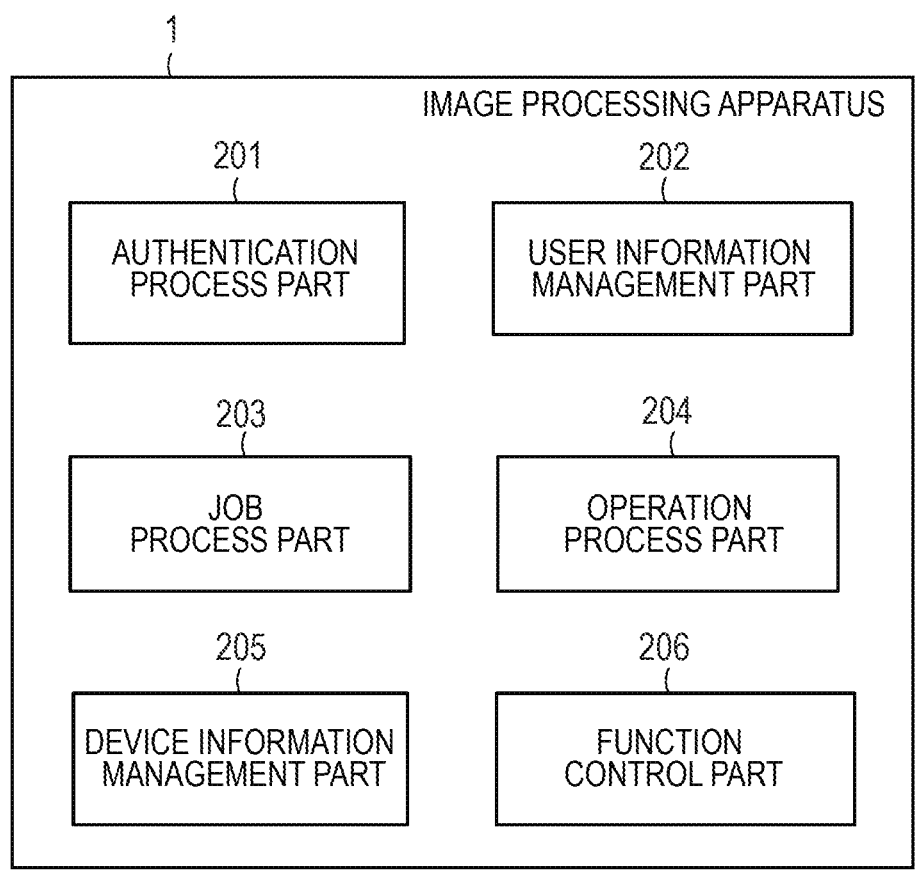
FIG. 2 is a software configuration diagram of the image processing apparatus according to the embodiment.

FIG. 2 is a diagram for describing an example of a software configuration that is a function of the image processing apparatus 1.

The image processing apparatus 1 has, as its functions, an authentication process part 201, a user information management part 202, a job process part 203, an operation process part 204, a device information management part 205 and a function control part 206. Each of such functional parts is a functional part that is realized by the CPU 100 loading a program installed in the HDD 103 into the RAM 102 by the boot ROM of the ROM 104 and executing the loaded program.

The authentication process part 201 receives a login/logout request from a user, and authenticates the user, thereby managing the user who uses the image processing apparatus 1.

The user information management part 202 manages user information inquired from the authentication process part 201. For example, the user information management part 202 manages the language to be used when the image processing apparatus 1 is used (for example, English or Japanese), so that the language to be used can be switched for each user. Besides, the user information management part 202 can manage a print job received from the information processing apparatus via the communication unit 101 for each user who has input the print job.

The job process part 203 processes various jobs to be performed by the image processing apparatus 1. More specifically, the job process part 203 controls the image generation unit 131 to perform a scan job, controls the image output unit 132 to perform a print job, and controls the communication unit 101 to perform a transmission job.

The operation process part 204 controls the display unit 120 to display various information for a user. Also, the operation process part 204 receives and processes an operation instruction from a user input from the input unit 121.

The device information management part 205 manages information related to the entire image processing apparatus 1. Specific examples of the information to be managed by the device information management part 205 include an IP address assigned to the apparatus or device, a setting value common to all users who use the apparatus or device, or the like. Incidentally, the device information management part 205 can also manage the same type of information as the information managed by the user information management part 202. For example, if it is assumed that the device information management part 205 uses English as the language to be used, an English message is presented to a user when the user who has not set a particular language uses the apparatus. However, if a user has set Japanese as the language to be used, it is possible to also present a Japanese message to this user.

The function control part 206 controls the functions of the image processing apparatus 1. As a specific example, the function control part 206 manages the number of print jobs that can be printed at one time, and print setting for restricting output. For example, in a case where the function control part 206 restricts use of one-sided printing, all users can output only the print job for which two-sided printing has been set.

Figure 13:
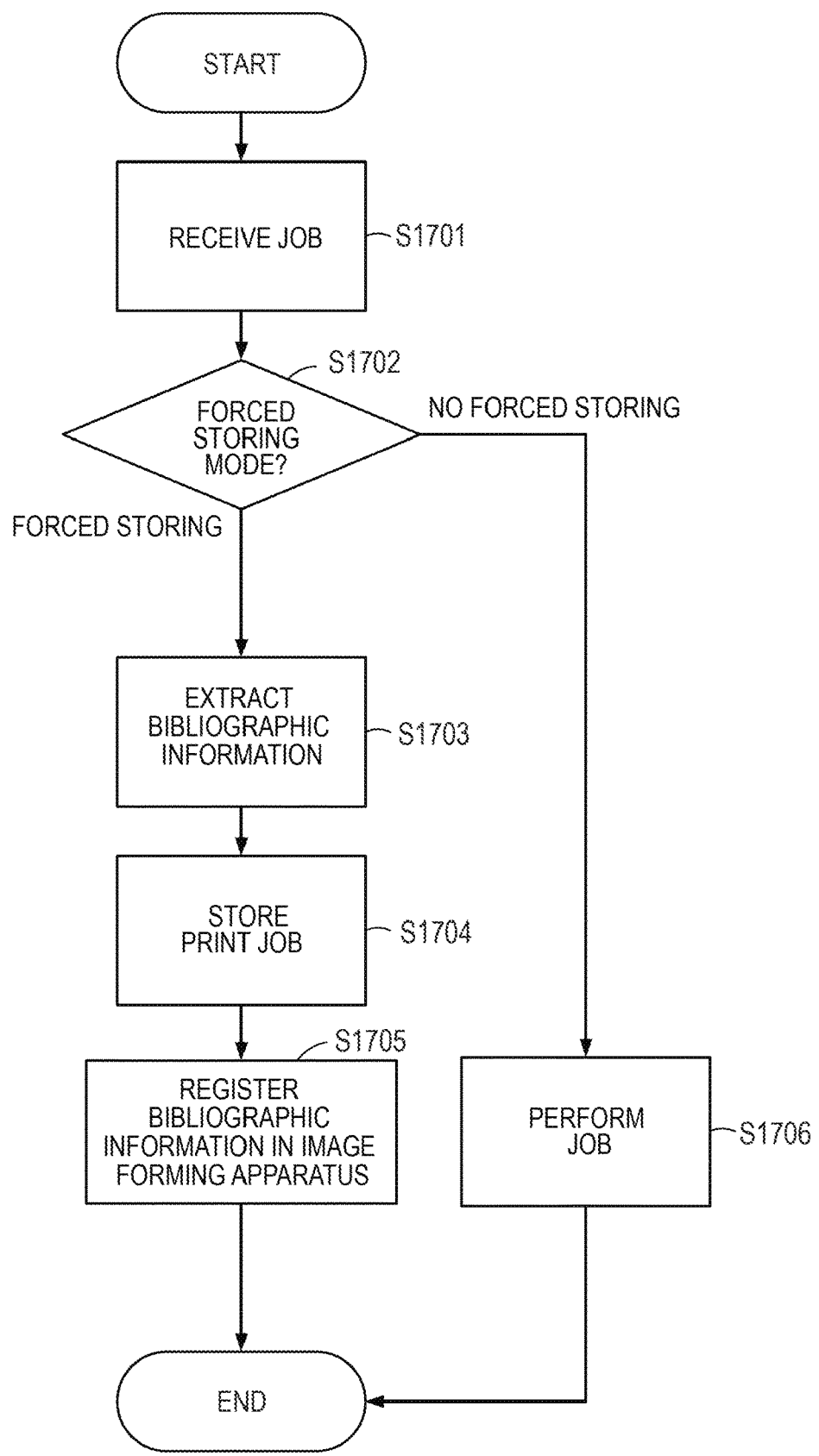
FIG. 13 is a flowchart for describing a print job storing process.

FIG. 13 is a flowchart for describing a print job storing process to be performed by the job process part 203. The process of this flowchart is performed by the CPU 100 of the image processing apparatus 1. In the present embodiment, it is assumed that the print job is input to the image processing apparatus 1 from a not-illustrated PC (personal computer) that is the information processing apparatus connected via the LAN 11.

Upon receiving the print job from the PC (S1701), the communication unit 101 transmits the print job to the job process part 203.

Upon receiving the print job, the job process part 203 confirms whether or not a forced storing mode is set (S1702). Here, the forced storing mode is a setting for the image processing apparatus 1 to store the received print job in the HDD 103 or the like. Incidentally, in the present embodiment, it is assumed that the forced storing mode is set by an administrator user of the image processing apparatus 1. However, each user may designate the forced storing mode for each user.

When the forced storing is not set in S1702 (in case of "no forced storing" in S1702), the job process part 203 advances the process to S1706.

In S1706, the job process part 203 performs the print job received in S1701. That is, the job process part 203 performs a printing process of print data included in the print job based on the print setting included in the print job.

On the other hand, when the forced storing of the print job is set in S1702 (in case of "forced storing" in S1702), the job process part 203 transmits the print job received in S1701 to the data management unit 304. The data management unit 304 uses the image analysis unit 130 to analyze the print job received from the job process part 203, and extract bibliographic information (S1703).

Next, the data management unit 304 stores the received print job and the extracted bibliographic information in the HDD 103 (S1704, S1705). Incidentally, the bibliographic information may be managed in the image processing apparatus, or may be transmitted to an external system and managed therein. The bibliographic information will be described later with reference to FIG. 12.

By the above, the print job storing process is performed.

Next, with reference to FIG. 3, a process from a start of the image processing apparatus 1 to display of a screen of a logged-in user will be described.

Figure 3:
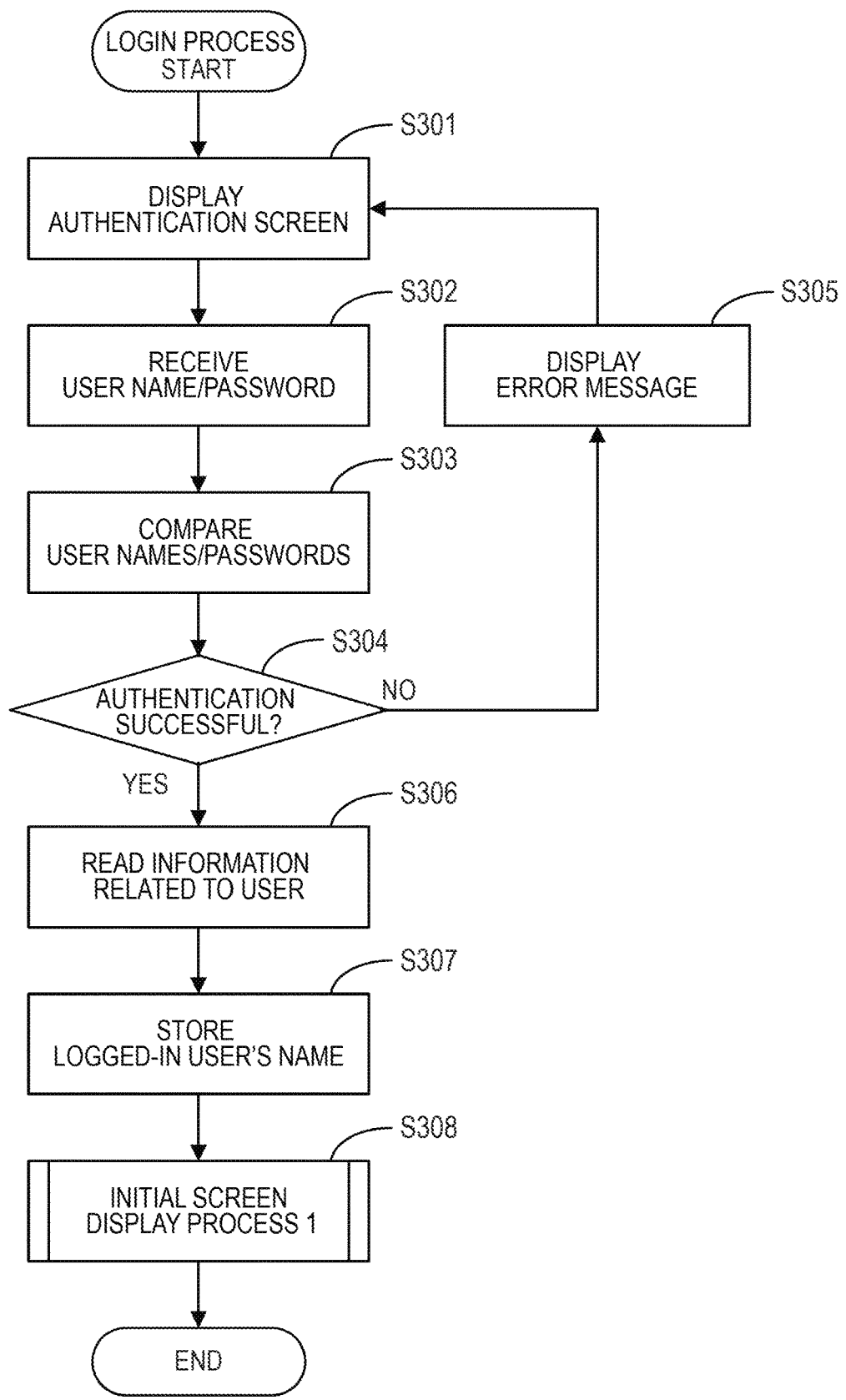
FIG. 3 is a flowchart for describing a process from a start of the image processing apparatus to display of a screen for a logged-in user.

FIG. 3 is the flowchart for describing the process from the start of the image processing apparatus 1 to the display of the screen for the logged-in user. Incidentally, the process of the flowchart illustrated in FIG. 3 is realized by the authentication process part 201, the user information management part 202, the job process part 203, the operation process part 204 and the device information management part 205. The login in the present embodiment is equivalent to user authentication to the image processing apparatus 1 by the method described here.

The authentication process part 201 displays a login screen (FIG. 4) on the display unit 120 when the image processing apparatus 1 is started or in response to a predetermined user operation (S301). A login request from a user is made by the user using the input unit 121 to input an ID and a password on the login screen (FIG. 4) displayed on the display unit 120.

Figure 4:
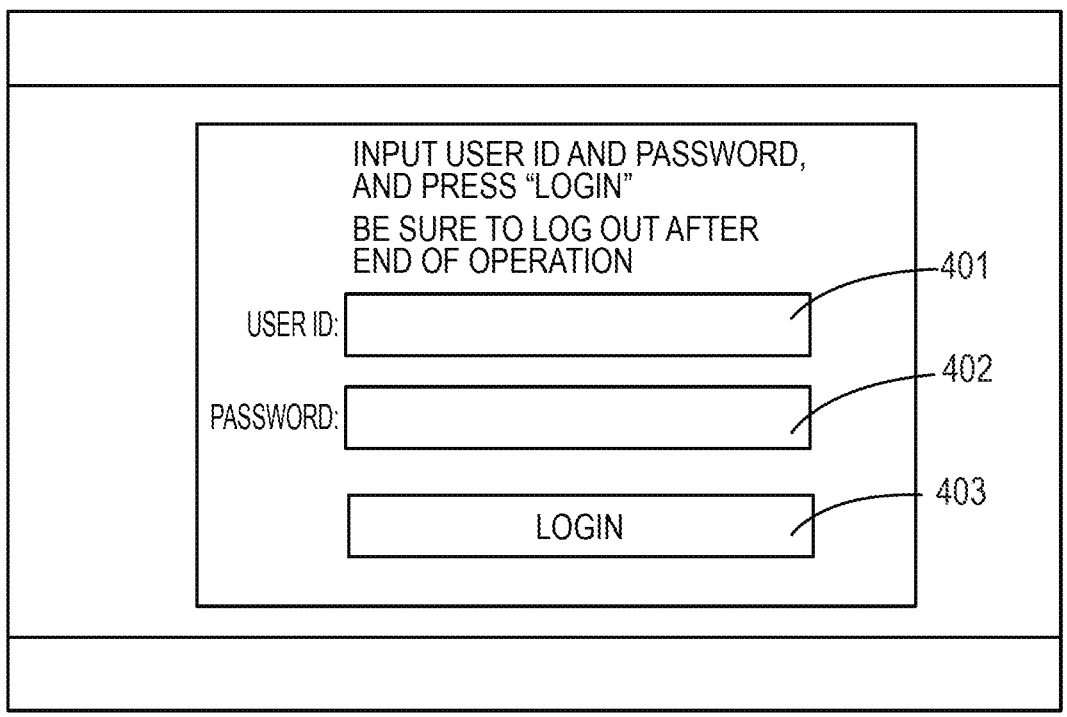
FIG. 4 is a diagram for describing an example of a login screen of the image processing apparatus.

FIG. 4 is the diagram for describing an example of the login screen to be displayed on the display unit 120.

The user makes the login request by inputting a user name (user ID that is user identification information) in a user ID input field 401, inputting a password in a password input field 402, and pressing a login key 403. Incidentally, the login request may be made by input from an IC card reading device, or a biometric authentication device such as a fingerprint authentication device or the like, that is connected to the input unit 121 of the image processing apparatus 1.

When the authentication process part 201 receives the user name and password in response to the login request made by the user (S302), the authentication process part 201 advances the process to S303.

In S303, the authentication process part 201 compares the user name and password input by the login request with the user name and password stored in the HDD 103.

Next, when the authentication process part 201 determines that the input user name and password are not coincident with the stored user name and password, it is determined that the authentication fails (NO in S304), and the authentication process part 201 advances the process to S305.

In S305, the authentication process part 201 displays an error message on the display unit 120 via the operation process part 204 for a certain period of time (S305), and returns the process to S301. That is, the authentication process part 201 again displays the authentication screen (login screen) on the display unit 120 via the operation process part 204.

On the other hand, when the authentication process part 201 determines that the input user name and password are coincident with the stored user name and password, it is determined that the authentication has been successful (YES in S304), and the authentication process part 201 advances the process to S306.

In S306, the user information management part 202 calls information associated with the user stored in the HDD 103.

Next, the user information management part 202 stores the user name of the user who has been successfully authenticated in S304 as a currently logged-in user in the HDD 103 (S307).

After that, the operation process part 204 performs a process (an initial screen display process 1 described later in FIG. 5) of displaying an initial screen reflecting the information of the logged-in user called in S306 on the operation process part 204 (S308). Incidentally, the initial screen in the present embodiment is a screen to be presented to the user immediately after logging in to the apparatus. Examples of screens that can be set as the initial screen include various application screens such as a copy application screen that allows setting and performance of a copy job, a portal screen (hereinafter referred to as "home screen") from which various applications can be selected, and the like.

Hereinafter, the details of the initial screen display process 1 in S308 of FIG. 4 will be described with reference to FIG. 5.

Figure 5:
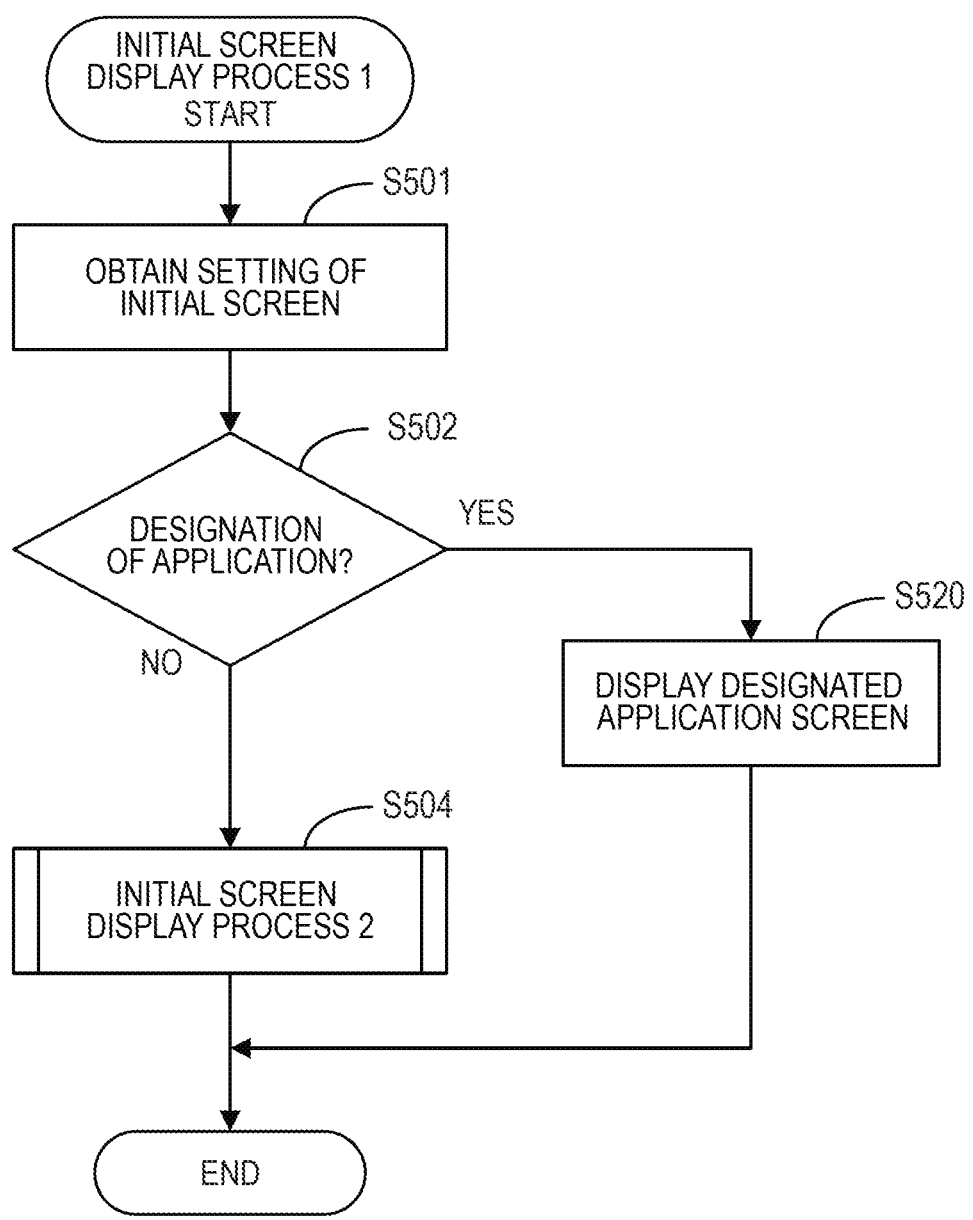
FIG. 5 is a flowchart for describing details of an initial screen display process 1.

FIG. 5 is the flowchart for describing the details of the initial screen display process 1 in S308 of FIG. 4.

In S501, the operation process part 204 obtains information related to the initial screen from the user information management part 202 and the device information management part 205, and determines the content of the initial screen presented to the logged-in user. More specifically, if there is an initial screen setting unique to the logged-in user in the user information management part 202, this setting is used. Otherwise, initial screen setting information stored in the device information management part 205 is used.

Subsequently, the operation process part 204 determines whether or not there is an application designation on the initial screen determined in S301 (S502). When the initial screen is various application screens such as a copy application screen and the like, it is determined that there is the application designation (YES in S502), and the operation process part 204 advances the process to S520.

In S520, the operation process part 204 displays the application screen designated as the initial screen on the display/operation device 12, and ends the process of this flowchart.

On the other hand, when the initial screen is not various application screens, it is determined that there is no application designation (NO in S502), and the operation process part 204 advances the process to S504.

Figure 6:
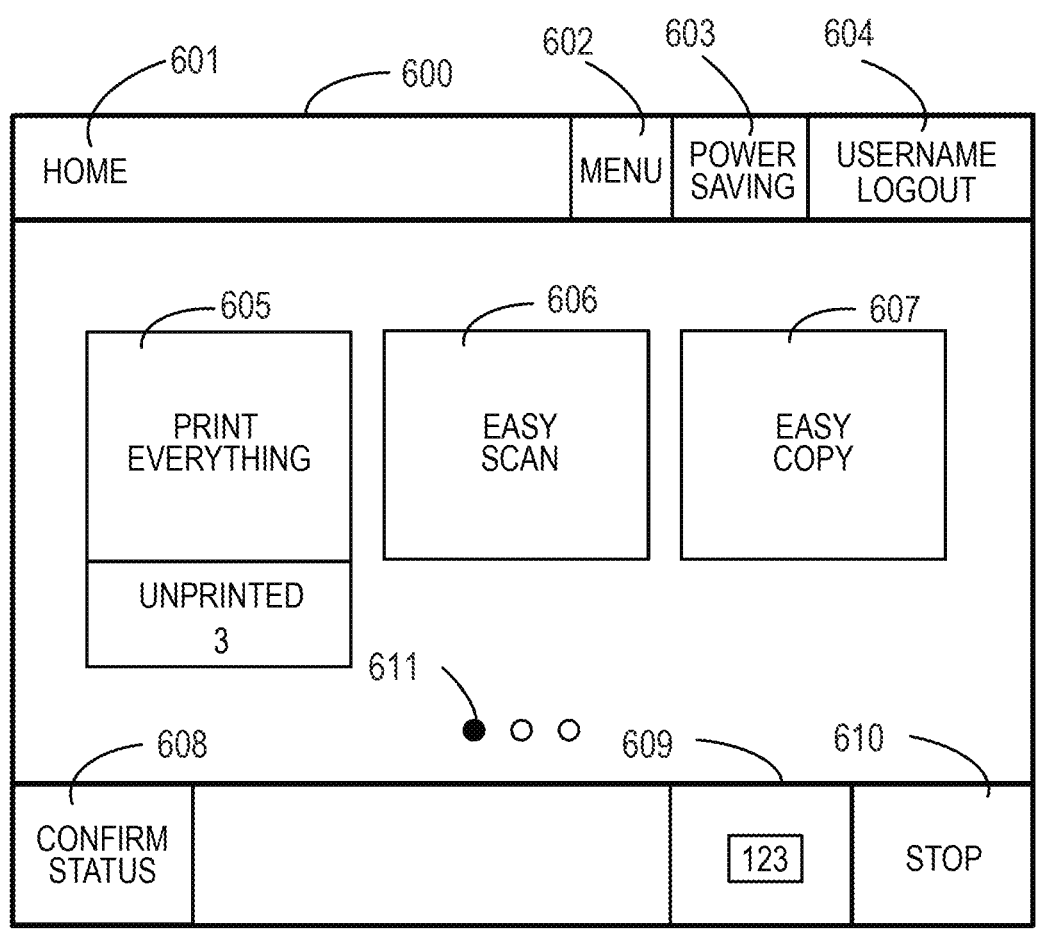
FIG. 6 is a diagram for describing a home screen to be displayed after a user logs in, in a first embodiment.

In S504, the operation process part 204 performs a process of displaying an initial screen (for example, a home screen as illustrated in FIG. 6) on the operation process part 204 (an initial screen display process 2 described later in FIG. 7) (S504).

Hereinafter, the details of the initial screen display process 2 in S504 of FIG. 5 will be described with reference to FIGS. 6 and 7.

FIG. 6 is the diagram for describing an example of the home screen to be displayed on the display unit 120 after the user logs in, in the first embodiment. The home screen is displayed when the print job under the name of the logged-in user is stored.

A home screen 600 is a screen to be displayed immediately after the user logs in to the image processing apparatus 1. A home notification area 601 is an area for notifying the user that the currently displayed screen is the home screen.

A menu button 602 is a button for performing setting related to a plurality of functions of the image processing apparatus 1.

A power saving button 603 is a button for making a transition of the state of the image processing apparatus 1 to a power saving state.

A user name notification area/logout button 604 is an area for displaying the user who is currently logged in to the image processing apparatus 1, and is a button for performing logout when it is pressed.

Application buttons 605 to 607 are buttons (icons) for instructing screen call or execution of respective applications. In the first embodiment, when the application button (hereinafter, referred to as a "PRINT EVERYTHING" button) 605 is pressed, it is possible to issue a print performance instruction for all print jobs (i.e., three print jobs in the example of FIG. 6) under the name of the logged-in user. In the present embodiment, as just described, when there is the print job that has been stored under the name of the logged-in user, such an immediate performance icon of the print job is displayed on the screen after the user logs in.

When the application button 606 is pressed, a setting screen for performing a scan function is called. When the application button 607 is pressed, a setting screen for performing a copy function is called.

A status confirmation button 608 is a button for transitioning to a screen for confirming progress statuses of current various jobs.

A counter confirmation button 609 is a button for transiting to a screen for confirming the total number of prints of a print job, or the like.

A stop button 610 is a button for transitioning to a screen for canceling a job currently being performed.

A home screen number display portion 611 indicates a current home screen number. In the example of FIG. 6, the home screen has the three screens in total, and the home screen number display portion indicates that the first home screen is currently displayed. Incidentally, each of the second home screen and the third home screen also has buttons and the like for activating respective applications, and the screen with the next number is displayed according to a user's input operation (for example, right flick operation).

Figure 7:
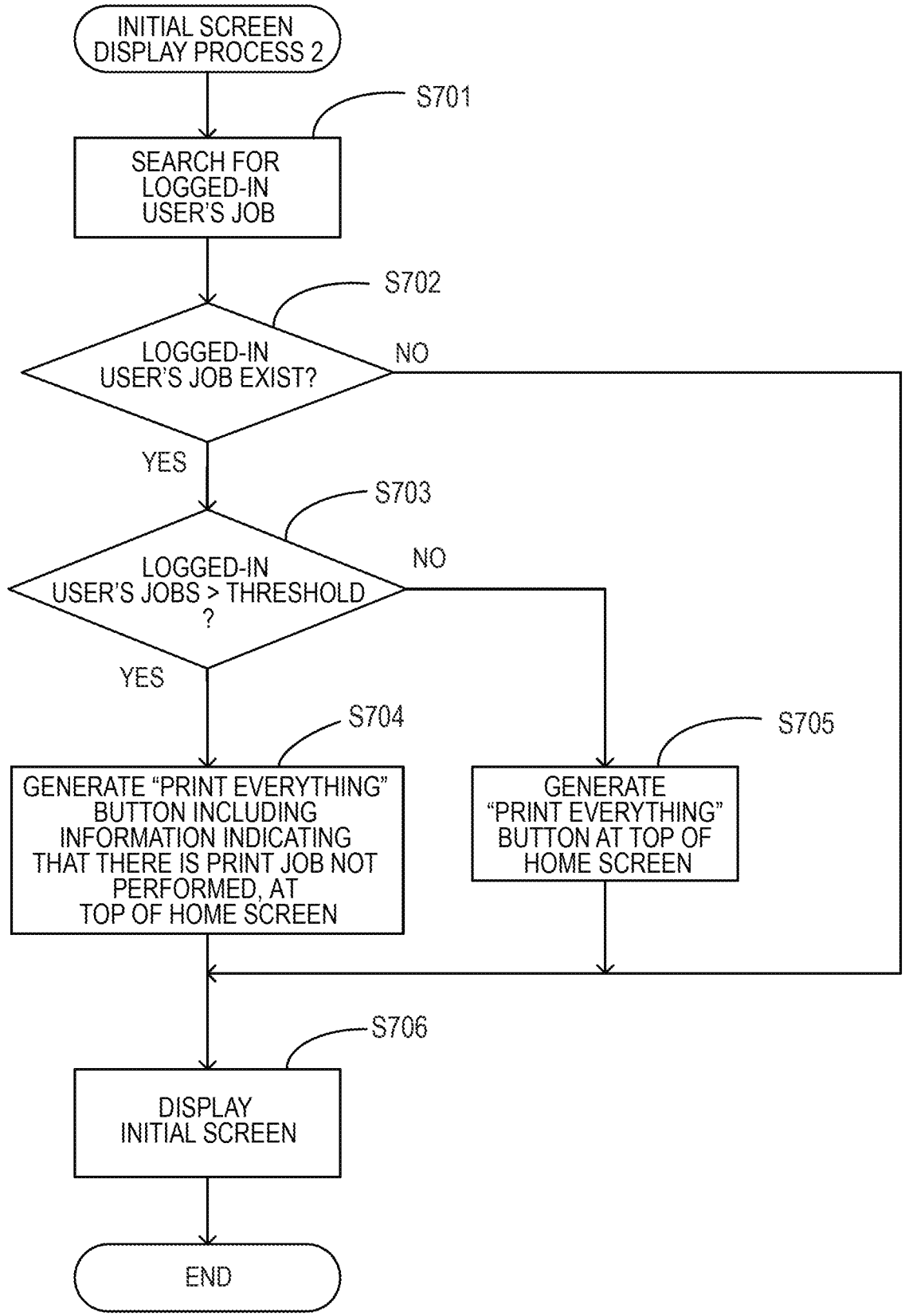
FIG. 7 is a flowchart for describing details of an initial screen display process 2.

FIG. 7 is the flowchart for describing details of the initial screen display process 2 in S504 of FIG. 5.

The operation process part 204 searches for whether or not the job of the logged-in user has been stored in the image processing apparatus 1 (S701). More specifically, the operation process part searches for the job from a job information management table managed in association with the user name of the print job. Here, the job information management table will be described.

Figure 12:
FIG. 12 is a diagram for describing a job information management table of the image processing apparatus.

FIG. 12 is the diagram for describing an example of the job information management table of the jobs stored in the image processing apparatus 1.

A job information management table 1200 is stored in the HDD 103 in association with the user (i.e., a user A in the example of FIG. 12) at the time when the job is stored.

As illustrated in FIG. 12, a plurality of pieces of information such as the date and time, the IP address of the image processing apparatus into which the print job is input, the storage site of the input print job, the print job name, the print setting and the like are stored in the job information management table 1200.

Hereinafter, the description returns to the explanation of the flowchart.

Next, the operation process part 204 determines whether or not the job of the logged-in user exists (S702). Then, when the job of the logged-in user exists (YES in S702), the operation process part 204 advances the process to S703. On the other hand, when the job of the logged-in user does not exist (NO in S702), the operation process part 204 advances the process to S706.

In S703, the operation process part 204 determines whether or not the number of the print jobs of the logged-in user stored in the image processing apparatus 1 is larger than the number of print jobs (i.e., a predetermined threshold) that can be printed at one time previously set by the function control part 206. Then, when the number of the print jobs of the logged-in user is larger than the number of the print jobs that can be printed at one time (YES in S703), the operation process part 204 advances the process to S704.

In S704, the operation process part 204 generates, on the home screen, a button (e.g., a button like a "PRINT EVERYTHING" button 801 in later-described FIG. 8) for performing all the print jobs of the logged-in user including the information indicating that there is a print job that is not performed, and advances the process to S706.

On the other hand, when the number of the print jobs of the logged-in user stored in the image processing apparatus 1 is equal to or less than the number of the print jobs that can be printed at one time previously set by the function control part 206 (NO in S703), the operation process part 204 advances the process to S705.

In S705, the operation process part 204 generates a button (e.g., a button like the "PRINT EVERYTHING" button 605 in FIG. 6) for performing all the print jobs of the logged-in user on the home screen, and advances the process to S706.

In S706, the operation process part 204 displays the initial screen, and ends the process of this flowchart.

Figure 8:
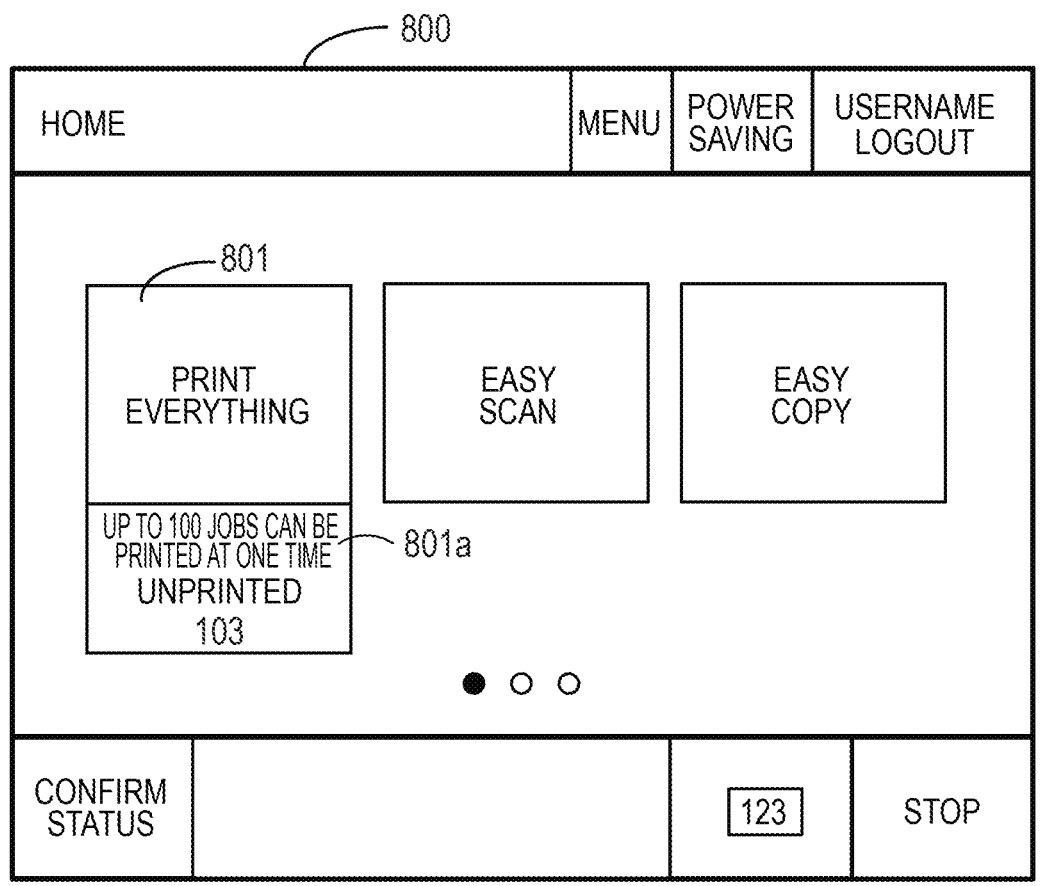
FIG. 8 is a diagram for describing a home screen to be displayed after a user logs in, in the first embodiment.

FIG. 8 is the diagram for describing an example of the home screen to be displayed on the display unit 120 after the user logs in in the first embodiment, and this home screen particularly corresponds to the example of the home screen displayed in the case of YES in S704 of FIG. 7.

A home screen 800 is a screen to be displayed when the print jobs under the name of the logged-in user, of which the number is equal to or larger than the number of the print jobs that can be printed at one time previously set by the function control part 206, are stored. Here, it is assumed that the number of the print jobs that can be printed at one time (i.e., the upper limit number) set by the function control part 206 is 100 jobs. Besides, it is assumed that the logged-in user is in a state of storing 103 print jobs. However, the present disclosure is not limited to these examples.

The home screen 800 is the screen to be displayed immediately after the user logs in to the image processing apparatus 1. The "PRINT EVERYTHING" button 801 is an application button for instructing screen call or performance of each application. Here, the logged-in user stores the 103 print jobs, and this number exceeds 100 being the number of the print jobs that can be printed at one time set by the function control part 206. Therefore, the job process part 203 prints only the 100 print jobs and does not print the remaining 3 print jobs. For this reason, the operation process part 204 adds a display (801a) notifying that the jobs not performed still exist, to the "PRINT EVERYTHING" 801. Thus, the operation process part notifies the user that all the print jobs stored are not output even if the user presses the button 801.

Incidentally, the above notification that the job not performed still exists is not limited to this. That is, a voice message indicating that the job not performed still exists may be output when the "PRINT EVERYTHING" button 801 is pressed.

As just described, according to the first embodiment, when the print restriction of the image processing apparatus has been set, the user can be alerted even when the print job corresponding to the restriction is stored. Thus, it is possible to improve the usability of the image processing apparatus.

Here, in the first embodiment, the function limitation of the image processing apparatus is the number of the print jobs that can be printed at one time. However, the present disclosure is not limited to this. For example, the user may be alerted as for a print job that is not printed due to a function restriction (prohibition of 1-in-1 printing, prohibition of color printing, etc.) related to the print setting of the print job.

Second Embodiment

In the above first embodiment, the constitution has been described in which the button including the alert that not all the print jobs are printed is printed when all the stored print jobs are not yet printed. However, in the button display similar to that in the case where all the stored print jobs are printed, it may be constituted to display a pop-up for alerting when the button is pressed. Hereinafter, such a constitution will be described.

Figure 9:
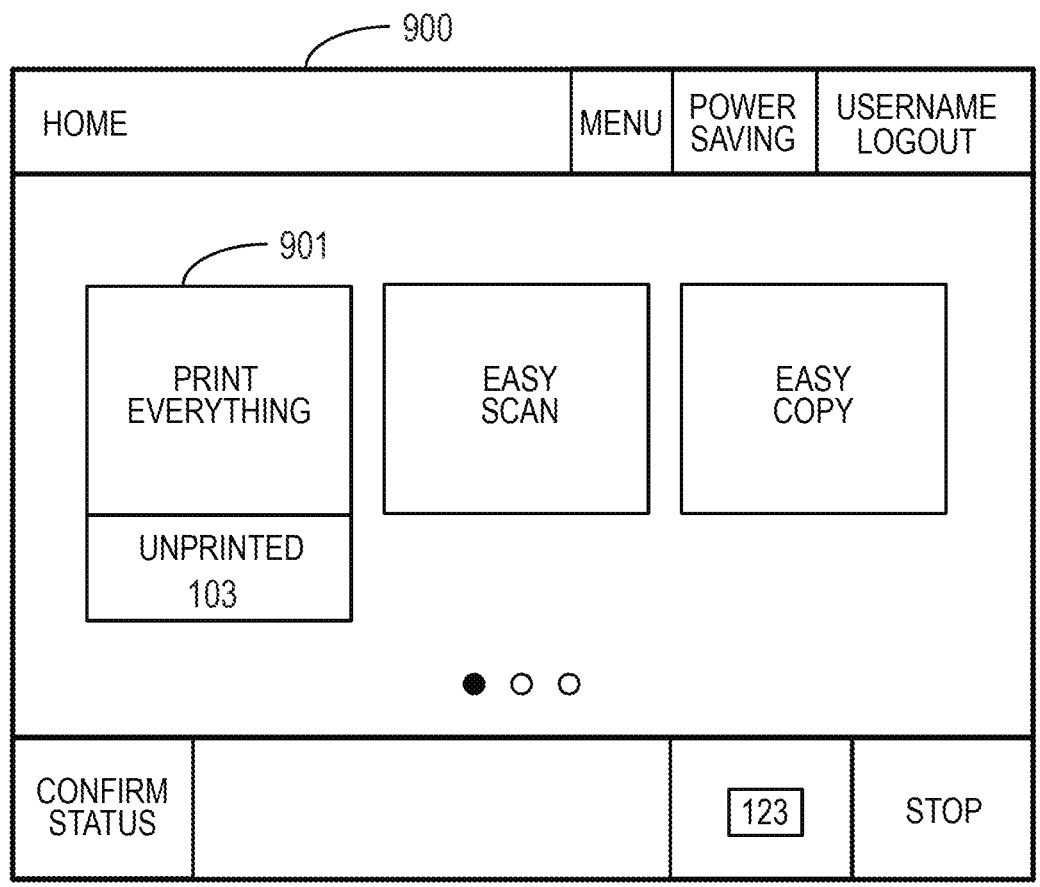
FIG. 9 is a diagram for describing a home screen to be displayed after a user logs in, in a second embodiment.

FIG. 9 is a diagram for describing an example of the home screen to be displayed on the display unit 120 after the user logs in, in the second embodiment.

A home screen 900 is displayed when the print jobs under the name of the logged-in user, of which the number is equal to or larger than the number of the print jobs that can be printed at one time set by the function control part 206, are stored. When a "PRINT EVERYTHING" 901 is pressed, the operation process part 204 displays a print performance alert pop-up 1000 illustrated in FIG. 10.

Figure 10:
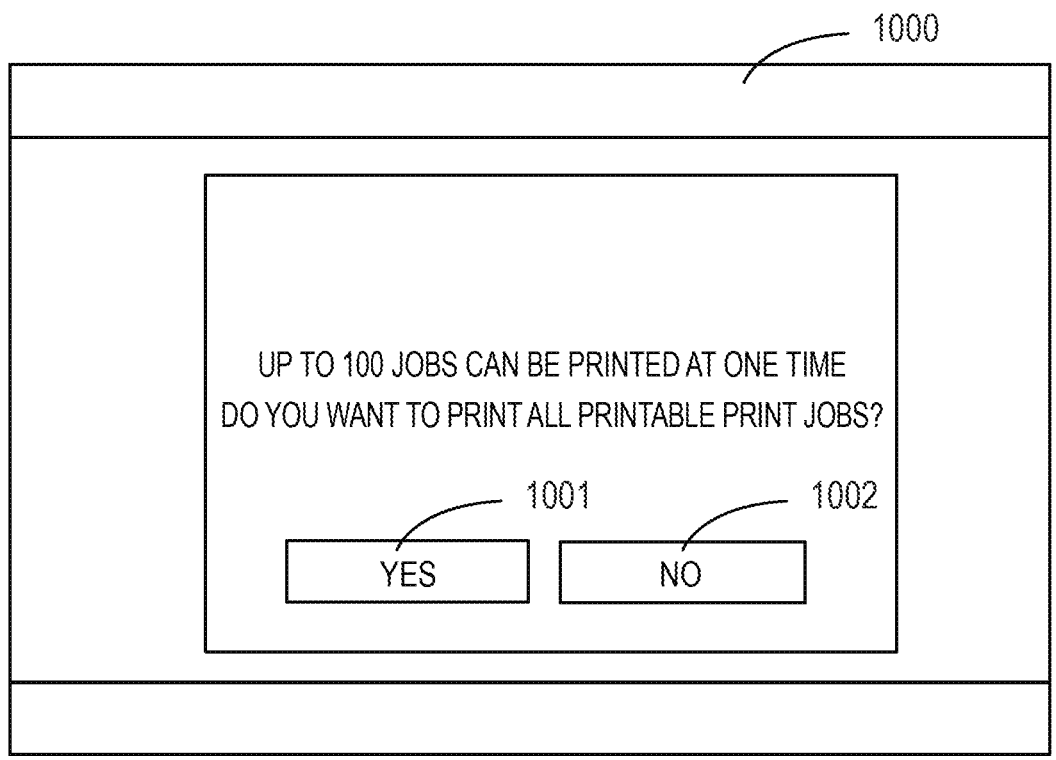
FIG. 10 is a diagram for describing a print performance alert pop-up to be displayed when a logged-in user presses a "PRINT EVERYTHING" button in the second embodiment.

FIG. 10 is the diagram for describing an example of a print performance alert pop-up to be displayed on the display unit 120 when the "PRINT EVERYTHING" 901 is pressed in the second embodiment.

By pressing a YES button 1001, the user can issue a print performance instruction for the print job that can be printed without being restricted by the print restriction of the function control part 206. In this example, by pressing the YES button 1001, the user can print the 100 print jobs. On the other hand, by pressing a NO button 1002, the user can cancel all print performance instructions.

As just described, according to the second embodiment, it is possible before starting printing to select whether to print only the printable jobs or cancel all the jobs, so that it is possible to improve usability for the user.

Third Embodiment

In the above first embodiment, the constitution has been described in which the user is alerted by the all print button displayed on the home screen. Besides, in the second embodiment, the constitution has been described in which the user is alerted when the all print button is pressed. However, a print job list screen may be displayed in a state that printable print jobs are being selected. This is also an effective method in a case where, when the number of the print jobs that can be printed at one time is restricted by the function control part 206, the user wants to select and print only the print jobs wanted to print.

Figure 11:
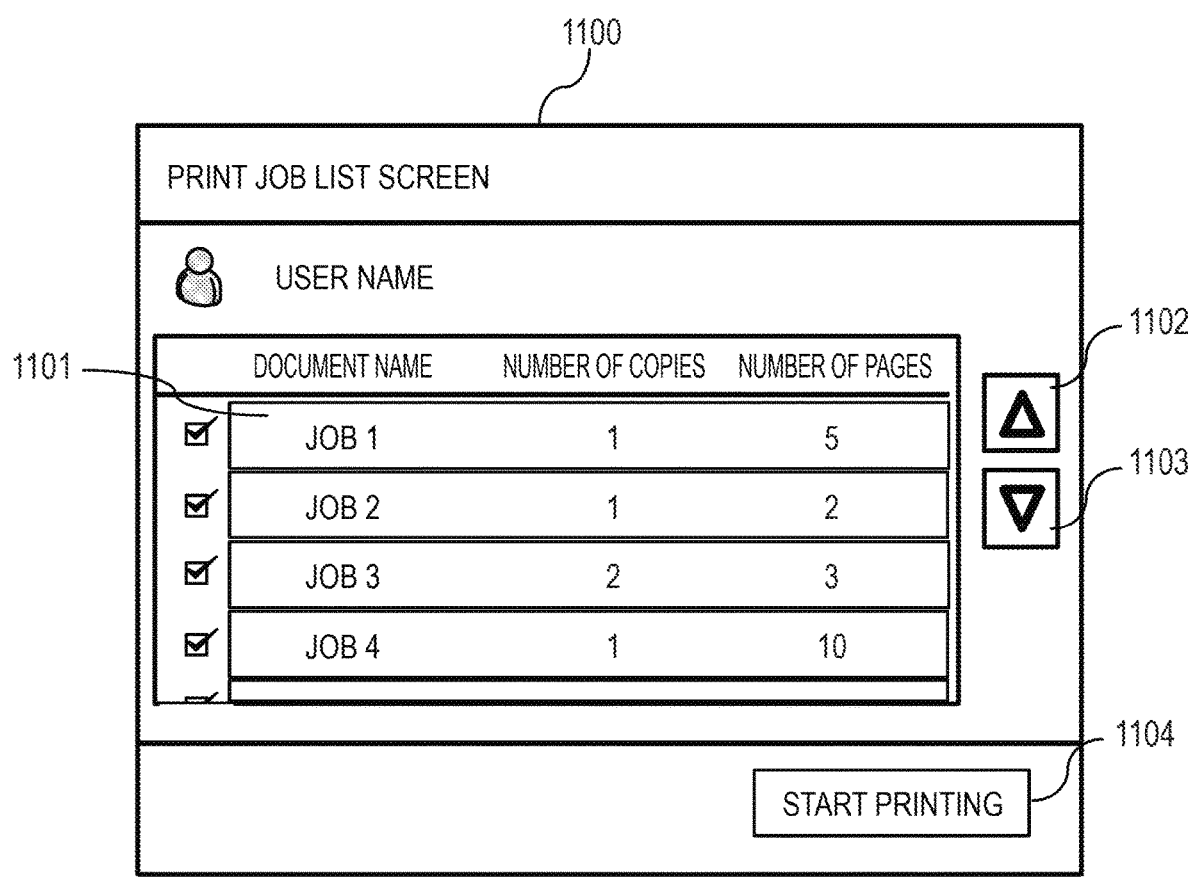
FIG. 11 is a diagram for describing a print job list screen to be displayed when a logged-in user presses a "PRINT EVERYTHING" button in a third embodiment.

FIG. 11 is a diagram for describing an example of the print job list screen to be displayed on the display unit 120 after the "PRINT EVERYTHING" button 901 is pressed in the third embodiment.

On a print job list screen 1100, a list of the print jobs that have been stored by the logged-in user is displayed. The user can change the selection state of the print jobs by pressing a print job button 1101.

Besides, by pressing a down button 1103, it is possible to refer to the rest of the list of the print jobs below the print job currently referred to. Besides, by pressing an up button 1102, it is possible to refer to the list of the print jobs above the print job currently referred to.

When a print start button 1104 is pressed, printing of the print job with the check box to the left of the print job button 1101 checked is started.

In the present embodiment, without being limited by the print restrictions of the function control part 206, the print job list screen 1100 is displayed in a state that the check box of job that can be printed is checked and the check box of the job that cannot be printed is not checked. Thus, before the start of the printing, the user can grasp the jobs that are not printed by confirming the check states of the check boxes. Incidentally, in a case where all the jobs cannot be printed due to the restriction of the number of printable copies, for example, the jobs are displayed in order from the oldest one in a state the check boxes of which number corresponds to the number of printable copies are checked. That is, on the print job list screen 1100, the print job that cannot be printed and the print job that can be printed are displayed in a distinguishable manner. In the case where all the jobs cannot be printed due to the restriction of the number of printable copies, the print jobs can arbitrarily be selected by rechecking the check box.

As just described, according to the third embodiment, before the start of the printing, it is possible to confirm the printable job and select the job to be printed, so that it is possible to improve usability for the user.

As just described, according to each of the embodiments, before the user instructs the immediate performance of printing by using the all-job print performance button or the like, it is possible to allow the user to recognize that there is the print job that is not printed among the print jobs stored corresponding to the relevant user in the image processing apparatus 1. Thus, even if the user issues the instruction to print all the stored print jobs related to him/her by using the all print performance button or the like, the user can easily recognize that there is the print job for which printing is not performed due to the output restriction or the like. For this reason, it is possible to solve the problem of the case where although the user instructs to immediately perform the printing of the print data stored in the image processing apparatus, a part of the print data among the print data stored in the image processing apparatus is not printed.

Incidentally, it is needless to say that the structure and contents of the various data described above are not limited to them, and may be composed of various structures and contents according to uses and purposes.

Although the embodiments have been described above, the present disclosure can take an embodiment as a system, an apparatus, a device, a method, a program, a storage medium or the like. More specifically, the present disclosure may be applied to a system composed of a plurality of devices, or may be applied to an apparatus composed of one device.

Besides, the present disclosure includes all constitutions and configurations obtained by combining the above embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-173144, filed Sep. 24, 2019, which is hereby incorporated by reference herein in its entirety.

What is claimed is:

1. An image processing apparatus having an operation device, comprising
one or more memories, and
one or more processors that execute a set of instructions to:
receive a print job from an information processing apparatus;
store the received print job in a storage device in association with user identification information;
perform a log-in process of a user;
without selecting by the user at least one print job among print jobs stored in association with user identification information of the user who is logged in the image processing apparatus, control the operation device to display an object for instructing to perform the at least one print job; and
perform the at least one print job of which a number falls within an upper limit number according to designation of an object for performing the at least one print job in a case where a number of the print jobs stored in association with user identification information of the user exceeds the upper limit number, wherein the upper limit number indicates a number of print jobs which are capable of being performed according to designation of the object,
wherein at least one print job which has not been performed according to the designation of the object among the print jobs stored in association with the user identification information of the user is to be performed in a next or subsequent designation of the object.

2. The image processing apparatus according to claim 1, wherein the one or more processors further execute the set of instructions to, in a case where at least one print job which has not been performed according to the designation of the object is included in the print jobs stored in association with the user identification information of the user, give notification that the at least one print job which has not been performed according to the designation of the object is included.

3. The image processing apparatus according to claim 2, wherein the notification is displayed on the operation device.

4. The image processing apparatus according to claim 2, wherein the notification includes the user identification information of the user who is logged in the image processing apparatus.

5. The image processing apparatus according to claim 1, wherein the at least one print job which has not been performed according to the designation of the object includes a print job corresponding to a function restriction set in the image processing apparatus.

6. A control method for an image processing apparatus having an operation device, the control method comprising:
receiving a print job from an information processing apparatus;
storing the received print job in a storage device in association with user identification information;
performing a log-in process of a user;
without selecting by the user at least one print job among print jobs stored in association with user identification information of the user who is logged in the image processing apparatus, controlling the operation device to display an object for instructing to perform the at least one print job; and
performing the at least one print job of which a number falls within an upper limit number according to designation of an object for performing the at least one print job in a case where a number of the print jobs stored in association with user identification information of the user exceeds the upper limit number, wherein the upper limit number indicates a number of print jobs which are capable of being performed according to designation of the object, wherein at least one print job which has not been performed according to the designation of the object among the print jobs stored in association with the user identification information of the user is to be performed in a next or subsequent designation of the object.

7. A non-transitory computer-readable storage medium on which is stored a computer program for making a computer execute a control method for an image processing apparatus having an operation device, the control method comprising:

receiving a print job from an information processing apparatus;

storing the received print job in a storage device in association with user identification information;

performing a log-in process of a user;

without selecting by the user at least one print job among print jobs stored in association with user identification information of the user who is logged in the image processing apparatus, controlling the operation device to display an object for instructing to perform the at least one print job; and performing the at least one print job of which a number falls within an upper limit number according to designation of an object for performing the at least one print job in a case where a number of the print jobs stored in association with user identification information of the user exceeds the upper limit number, wherein the upper limit number indicates a number of print jobs which are capable of being performed according to designation of the object, wherein at least one print job which has not been performed according to the designation of the object among the print jobs stored in association with the user identification information of the user is to be performed in a next or subsequent designation of the object.

* * * * *